United States Patent
Davies

(10) Patent No.: US 9,682,720 B2
(45) Date of Patent: Jun. 20, 2017

(54) STEERING COLUMN ASSEMBLY

(75) Inventor: Niclas Davies, West Glamorgan (GB)

(73) Assignee: TRW Limited, West Midlands (GB)

( * ) Notice: Subject to any disclaimer, the term of this patent is extended or adjusted under 35 U.S.C. 154(b) by 229 days.

(21) Appl. No.: 13/635,761

(22) PCT Filed: Mar. 18, 2011

(86) PCT No.: PCT/GB2011/050539
§ 371 (c)(1),
(2), (4) Date: Jan. 11, 2013

(87) PCT Pub. No.: WO2011/114166
PCT Pub. Date: Sep. 22, 2011

(65) Prior Publication Data
US 2013/0098192 A1 Apr. 25, 2013

(30) Foreign Application Priority Data
Mar. 19, 2010 (GB) .................................. 1004632.4

(51) Int. Cl.
*B62D 1/19* (2006.01)
*B62D 1/184* (2006.01)

(52) U.S. Cl.
CPC ............. *B62D 1/184* (2013.01); *B62D 1/195* (2013.01)

(58) Field of Classification Search
CPC . B62D 1/18; B62D 1/184; B62D 1/19; B62D 1/192
(Continued)

(56) References Cited

U.S. PATENT DOCUMENTS 7,607,696 B2 10/2009 Graf
2009/0031843 A1\* 2/2009 Marable et al. ............... 74/493
(Continued)

FOREIGN PATENT DOCUMENTS

DE 102005056308 B3 3/2007
EP 2022699 A2 2/2009
(Continued)

OTHER PUBLICATIONS

International Search Report for International Application No. PCT/GB2011/050539 dated Jul. 22, 2011.
(Continued)

*Primary Examiner* — William C Joyce
(74) *Attorney, Agent, or Firm* — MacMillan, Sobanski & Todd, LLC

(57) ABSTRACT

A steering column assembly has an adjustable shroud comprising a fixed portion secured to the vehicle body and a moving portion which can be collapsed telescopically through a normal range of adjustment relative to the fixed portion, a support bracket secured to a fixed part of the vehicle and a clamp mechanism. The assembly includes a blocking mechanism which is an integral part of a locking lever of the clamp assembly so arranged that when the clamp mechanism is in unclamped the blocking mechanism prevents the moving portion from collapsing beyond the normal range of movement in the collapse direction by providing a path for axial forces applied to the moving portion to pass through the blocking mechanism to a stopper fixed relative to the vehicle body and when the clamp mechanism is clamped the blocking mechanism is held clear of the stopper to permit additional telescopic movement of the moving portion towards the fixed portion beyond the normal range of adjustment.

11 Claims, 3 Drawing Sheets

(58) Field of Classification Search
USPC .................................... 74/493; 280/775, 777
See application file for complete search history.

(56) References Cited

U.S. PATENT DOCUMENTS

2009/0145258 A1* 6/2009 Davies ................... B62D 1/184
74/495
2009/0167009 A1 7/2009 Cymbal et al.

FOREIGN PATENT DOCUMENTS

| GB | 2260953 A | 5/1993 |
| GB | 2451506 A | 2/2009 |
| GB | 2454345 A | 5/2009 |
| JP | 2005001517 A | 1/2005 |
| JP | 2007055580 A | 3/2007 |

OTHER PUBLICATIONS

Intellectual Search Report under Section 17 for GB 1004632.4 dated Jul. 14, 2010.

* cited by examiner

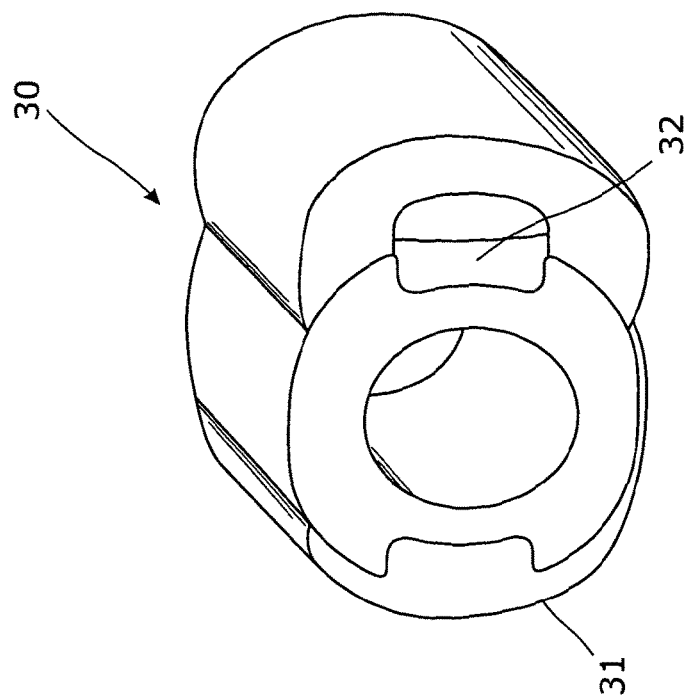
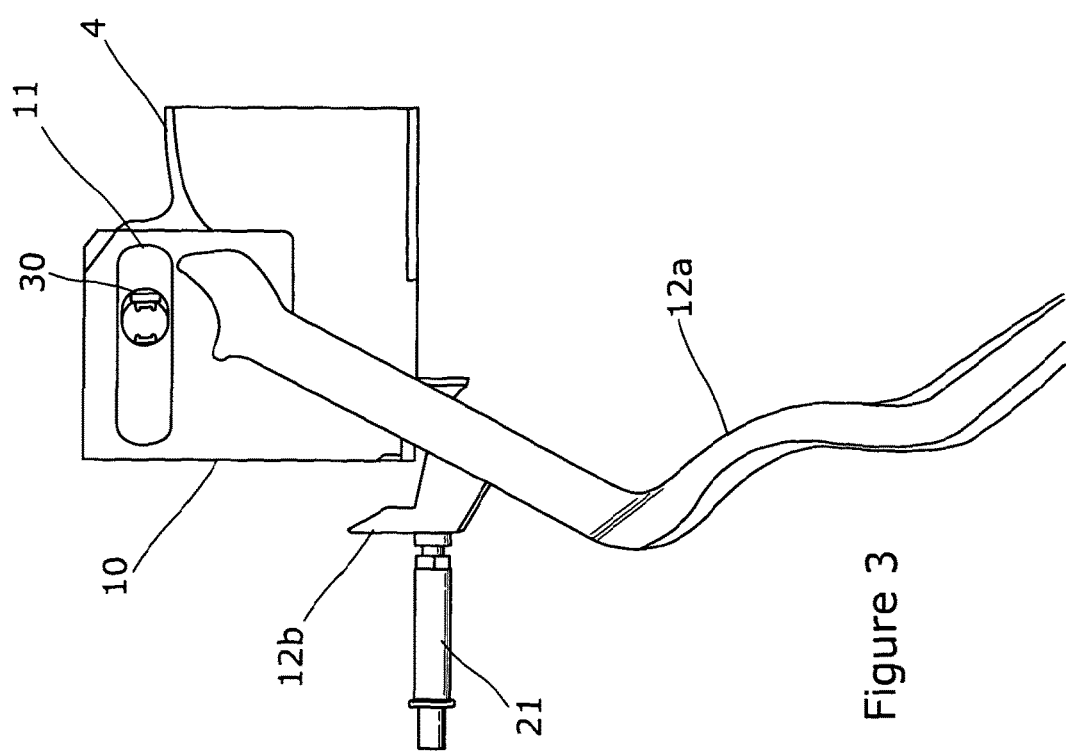

STEERING COLUMN ASSEMBLY

CROSS-REFERENCE TO RELATED APPLICATIONS

This application is a national stage of International Application No. PCT/GB2011/050539 filed Mar. 18, 2011, the disclosures of which are incorporated herein by reference in entirety, and which claimed priority to Great Britain Patent Application No. GB 1004632.4 filed Mar. 19, 2010, the disclosures of which are incorporated herein by reference in entirety.

BACKGROUND OF THE INVENTION

This invention relates to steering column assemblies and in particular to steering column assemblies that are adjustable for reach.

It is known to provide steering columns that adjust for reach. Typically, they comprise a two part steering shaft that can be adjusted in length by one part telescoping over the other. To hold the shaft at the desired length it is known to provide a telescopic steering column shroud that comprises a fixed shroud portion that is secured to a part of the vehicle and a moving shroud portion that can move relative to the fixed part to vary the overall length of the shroud. Bearings within the shroud portions support the steering shaft whilst allowing it to rotate. Typically the two portions comprise tubes, one tube fitting within the other as they are collapsed together.

In use a releasable clamp mechanism secures the moving portion in the desired position relative to the fixed portion. In the clamped position the clamp mechanism prevents accidental adjust to the reach of the steering. In an unclamped, adjustment, position, it allows the moving portion to move so that the reach can be adjusted.

The clamp mechanism typically acts between the moving shroud portion and a bracket that is fixed to a mount secure to the vehicle. The bracket, or at least part of it, could in fact be considered to form a part of the clamp mechanism. The shroud will therefore be fixed at two points, one connecting the fixed portion to the vehicle and the other connecting the moving portion to the vehicle through the bracket. A suitable clamp mechanism comprises a bracket having two dependent arms that are located to either side of a rail mounted on the moving portion. A clamp pin passes through an opening in one arm of the bracket, through openings in the rail and then through an opening in the other arm. One end of the clamp mechanism carries a fixed head and the other a cam that acts between a further fixed head and the arm of the bracket. The cam can be moved to squeeze the arms of the bracket onto the rail, clamping it in place. For reach adjustment the rail is provided with elongate slots through which the clamp pin passes. The length of the slot largely determines the limit of movement of the moving portion.

The bracket primarily locates the moving portion relative to the vehicle and the fixed portion when it is clamped. Most of the forces applied to the moving portion can therefore pass through the bracket to be reacted by the vehicle body. In the event of a crash, it is important that the moving portion can break free of the mount so that the moving portion is set free to telescope towards the fixed portion. This is typically achieved by providing one or more capsules between the bracket and the vehicle. In the event that a high force is applied to the moving portion, such as when a driver's torso strikes the steering wheel in a frontal impact, the capsules break allowing the bracket to break free of the vehicle. The moving portion is then free to collapse towards the fixed portion.

To aid in the absorption of the collapse force after the capsule has broken it is known to provide one or more energy absorbing devices that are deformed as the collapse continues beyond its normal range of adjustment. The deformation of the device absorbs the collapse energy in a controlled manner.

It is also desirable, but by no means essential, that clamping of the bracket to the rail may also simultaneously secure the moving portion to the fixed portion. The benefits of this would be to maximise the bending stiffness of the total column assembly in the clamped condition and to ensure that there is a predictable amount of sliding friction between the two portions, in the clamped condition, which can contribute a specified proportion of the total energy-absorbing crash force required during collapse.

A partial split in an outermost one of the two portions may be used to help ensure that the squeezing action of the cam-tensioned clamp bolt leads to effective Tube-to-Tube clamping simultaneously with the aforementioned clamping of the upper shroud portion to the said bracket.

As already stated the clamping mechanism in such a design, when not released, secures the upper portion to the bracket. The bracket is in turn rigidly attached to the vehicle by mechanically fusible connections (known as break Capsules) at all times, except in a crash. In a crash, the bracket moves slideably relative to the mount, the said capsules having been fractured by a proportion of the force of impact of the driver's torso on the steering wheel. The initial driver impact (or "breakaway") force has to overcome a combination of the capsule fracturing force, the Tube-to-Tube friction and sliding friction between the bracket and the mount. The movement between the bracket and the mount can be optimised by providing a so called "Ride down mechanism" which acts between the mount and bracket to absorb energy.

Once the capsules have broken and the bracket has slid by a few millimetres relative to the mount, the ride down mechanism may come into play as a partial means of controlling the force required to continue the telescopic collapsing of the column to the full limit of its stroke. The ride down mechanism may comprise a strip of metal that is attached to the bracket at one end and is shaped with a loop in such a way that it is progressively deformed, absorbing energy, by being dragged over an abutment on the mount during the telescopic collapsing of the column. Typically, the loop of the Energy Strap will have some initial clearance relative to the said abutment so that it does not contribute to the initial breakaway force.

The force which, in a crash, is required to act on the steering wheel in order for the column to telescopically collapse is usually specified to be much greater than the force which would realistically be applied to the wheel by a driver either in normal driving or when adjusting the position of the steering wheel. It is considered that some drivers could, in extremis, exert a sustained forward axial force of up 1500N on the wheel. Alternative, a shock load of up to 2500N could be realised if a driver rapidly adjusts the position of the upper column such that it impacts abruptly on the forward limit stop of the Reach adjustment travel.

A typical specification for crash-collapse force (as would be given by a vehicle manufacturer) would require that an axial force of approximately 6000N should be required to cause initial disconnection (breakaway) of the bracket from the mount in a crash and that a force of 2000N to 4000N would be required to cause collapse through the remainder of the telescopic travel.

However, with the type of Tube-in-Tube reach-Adjustment column described above (i.e. one having a partially split outer tube or other device for ensuring effective Tube-to-Tube clamping), it should be noted that the resistance to column collapse in crash is partly provided by the tube-to-tube friction. Typically, this tube-to-tube friction would be approximately 1500N. It should be noted that the contribution from tube-to-tube friction is not present while the column is unclamped for the purpose of adjusting the position of the steering wheel. Nevertheless, the remaining 4500N (i.e. 6000-1500) of breakaway resistance still present is ample to resist the potential "abuse" loads that a driver could inflict. (Note that the remaining 4500N of breakaway force derives from the strength of the said Capsules and from friction between the bracket and the mount.)

A problem may arise, though, if a vehicle manufacture specifies an unusually low breakaway force threshold; e.g. 3000N (in the clamped condition). In this event, the remaining breakaway resistance still present when the column is unclamped will only be 1500N (i.e. 3000-1500) and this will be insufficient to ensure that the Capsules are not fractured, and the crash stroke is not initiated, by abuse loads deriving from the driver during adjustment of the steering wheel.

In such a prior art design it may therefore possible for a load to be applied by a driver during adjustment that is great enough to cause damage to the steering column assembly by causing the capsules to break and perhaps cause some initial movement between the bracket and the mount. This may comprise the safety of the steering assembly and adversely affect its performance in a crash.

In EP 2 022 699 A2 it is proposed to provide a means for bypassing the ride down mechanism when the clamp mechanism is unclamped. The solution described is to provide a load transfer means that takes the axial load from the upper shroud directly onto the lower shroud when the column reaches its shortest length, away from the ride down mechanism. Several arrangements are disclosed for bypassing the ride down mechanism. The applicant has appreciated that all the arrangements disclosed have significant limitation and has sought to provide an alternative solution that overcomes at least partially the limitations.

BRIEF SUMMARY OF THE INVENTION

It is a feature of the invention to at least partially ameliorate this problem in the prior art in relation to a steering column assembly of the kind set forth. Nevertheless, it should be understood that the invention also applies to other types of steering column assembly that permit reach adjustment.

According to a first aspect the invention provides a steering column assembly having an adjustable shroud comprising a fixed portion secured to the vehicle body and a moving portion which can be collapsed telescopically through a normal range of adjustment relative to the fixed portion, a support bracket secured to a fixed part of the vehicle through a ride down mechanism which permits relative movement of the bracket and the vehicle in the event that a force is applied to the upper shroud part that exceeds a predetermined level, a clamp mechanism which releasably fixes the moving portion in position relative to the support bracket mounted to the vehicle body, the clamp mechanism being movable between a first, unclamped, position in which the moving portion can move relative to the support bracket and the fixed portion and a second, clamped, position in which the fixed portion and moving portion are prevented from relative movement by clamping of the moving portion to the support bracket, and a blocking mechanism so arranged that when the clamp mechanism is in its first position the blocking mechanism prevents the moving portion from collapsing beyond the normal range of adjustment in the collapse direction by providing a path for axial forces applied to the moving portion to pass through the blocking mechanism to a stopper fixed relative to the vehicle body, the path bypassing both the ride down mechanism and the clamp mechanism, and when the clamp mechanism is in its second position the blocking mechanism is held clear of the stopper to permit additional telescopic movement of the moving portion towards the fixed portion beyond the normal range of adjustment.

The blocking mechanism therefore ensures that when the clamp mechanism is unlocked, the maximum allowed collapse is limited yet when the clamp mechanism is locked more collapse is possible. The force path from the moving portion through the blocking mechanism to the fixed portion ensures that excess force is not applied to the ride down mechanism or the clamp mechanism which could damage them. Yet, when clamped further collapse is allowed as may be desirable to bring into play various energy absorbing elements that help dissipate energy in an accident.

The clamp mechanism may comprise a U-shaped bracket having spaced arms that fit around a rail secured to the moving portion, each of the spaced arms of the bracket including an opening through which a clamp pin passes, the clamp pin also passing through at least one elongate slot in the rail and being free to move along the elongate slot when the clamp mechanism is in its first position and prevented from moving when in its second position.

The stopper may comprise a part of the lower shroud portion, or a part of the vehicle body. In a preferred arrangement where the fixed portion is secured to a housing of a gearbox of an electric power steering system the stopper may be part of, or fixed to, the gearbox.

In a most preferred arrangement the stopper is adjustable relative to the lower shroud portion. It may comprise a block threadedly secured to a shaft which is fixed relative to the fixed part to permit axial adjustment of the position of the stopper relative to the fixed part. The end of the threaded shaft remote from the stopper may be located in a hole provided in a gearbox housing onto which the fixed portion is secured.

The blocking mechanism may comprise a blocking part of a clamp lever which includes a grip part and which can be operated by a user to move the clamping mechanism between the first and second positions, the blocking part of the lever moving into a position where it contacts the stopper to prevent excess travel as the lever is moved to place the clamp mechanism in the unclamped position, and then moving out of the way of the stopper when the clamp mechanism is clamped. This blocking part may comprise a finger which extends generally away from the axis of rotation of the lever, and may comprise an integral part of the lever, it being made all of one piece. Providing the blocking part as an integral part of the lever which is used to clamp and unclamp the assembly is a convenient way to provide a blocking portion without the need to introduce any additional components to the assembly.

The blocking part of the lever may contact a part of the moving shroud part as well as the stopper when the end of normal travel is reached, or contact something rigidly fixed to the moving shroud portion. It may contact a part of the clamp rail secured to the moving portion.

The moving portion may slide over the fixed portion, with either direct contact or through a spacer of low friction material. The moving portion may comprise an upper shroud part and the fixed portion may comprise a lower shroud part. The upper part may be the part nearest the steering wheel.

Although not essential, it is preferred that the fixed and moving portions comprise cylindrical tubes with the moving shroud portion having a larger inner diameter than the outer diameter of the fixed portion, the moving portion collapsing telescopically over the fixed portion. A further slot may be provided in the outer tube that can close up on clamping of the clamp mechanism.

The ride down mechanism may comprise one or more crash elements which absorb force by deforming in the event of a crash. The or each element may comprise a crash strap that may be looped around one or more pegs attached to the fixed and/or moving portions. Importantly, the limited range of collapse allowed by the blocking mechanism should be chosen such that the crash elements are not deformed during adjustment. They should only come into play in a crash that causes collapse beyond the normal range.

A resilient spacer may be provided which must be compressed for the moving portion to reach the end of its normal range of travel in collapse by a compressive force that exceeds a predetermined value which is less than the force required to activate the ride down mechanism, the spacer when uncompressed ensuring that the assembly is held a small distance away from its maximum normal range of travel and so ensures that a small gap is present between the stopper and the blocking mechanism sufficient to enable the clamp to be moved to the clamp position without the blocking mechanism striking the stopper. This is especially useful when the blocking mechanism comprises a part of the clamp lever which must swing through an arc as the lever is rotated to reach its blocking position adjacent the stopper.

As an alternative to the resilient spacer, some other compliance may be built into the system that enables the moving portion to move a small additional further distance during normal movement when an axial load is applied to the moving shroud portion that moves the stopper and blocking mechanism into contact.

The resilient spacer may act between the clamp mechanism and the moving portion.

In a most preferred arrangement where the clamp mechanism includes a clamp pin that can move along at least one elongate slot in a clamp rail that is fixed to, or integral with, the moving portion, the spacer may act between the clamp pin and an end of the at least one slot when the moving portion reaches the end of its normal range of travel.

Of course, the slot may be provided in the mounting bracket (typically a u-shaped bracket) in which case the spacer may act between the clamp pin and the end of the slot in the bracket.

The spacer may comprise a compressible sleeve which fits around at least a part of the clamp pin.

The shroud may support a steering shaft that can also telescope and has at least two parts. This may be supported relative to the shroud by bearings.

Other advantages of this invention will become apparent to those skilled in the art from the following detailed description of the preferred embodiments, when read in light of the accompanying drawings.

BRIEF DESCRIPTION OF THE DRAWINGS

FIG. 3 is a detail view of the location of the clamp pin and the slot in the clamp rail of the embodiment of FIG. 1 with the upper shroud midway in its range of travel; and FIG. 4 is a detail view of the clamp pin and sleeve which defines a spacer.

DETAILED DESCRIPTION OF THE INVENTION

Figure 1:
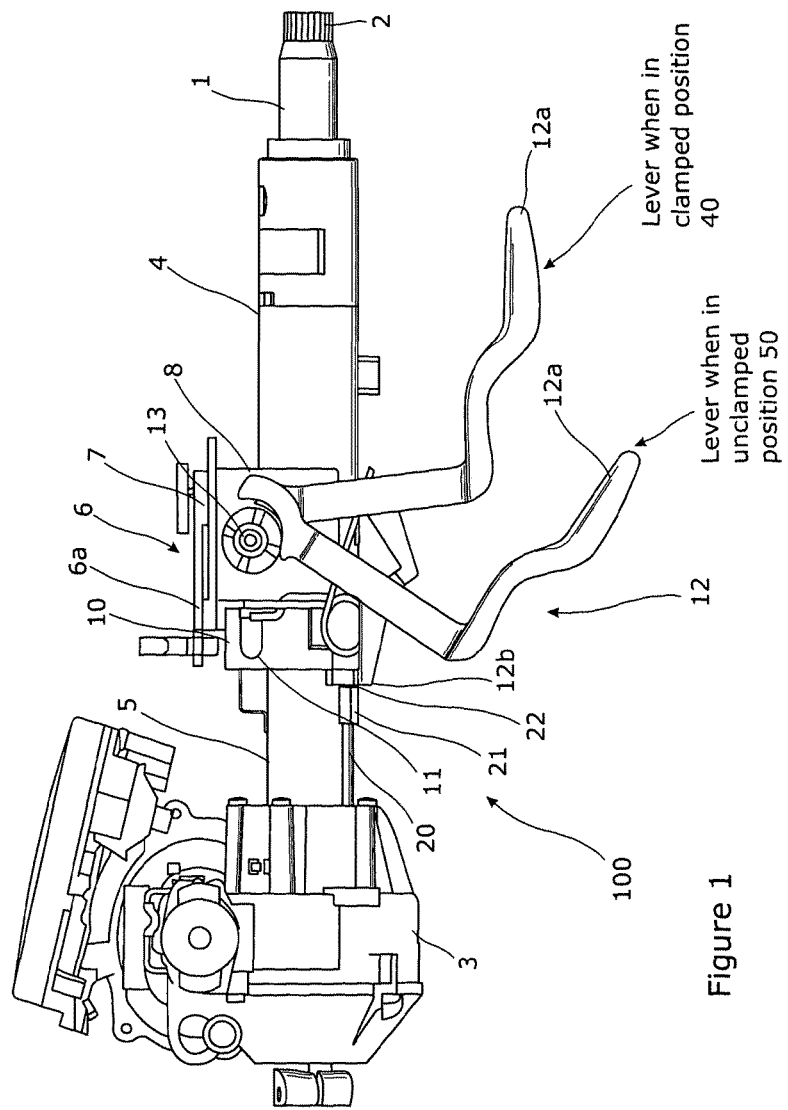
FIG. 1 is a view of an embodiment of a steering column assembly according to the present invention.

As shown in FIG. 1, a reach adjustable steering column assembly 100 comprises a two part steering shaft 1 that is located by upper and lower bearings within a telescopic steering column shroud. The shaft 1 having a splined end part 2 that receives a steering wheel (not shown) and connects the wheel to a part of the steering gear (not shown). In the embodiment shown it in fact connects to the steering rack and a gearbox located within a gearbox housing 3 which provides power assistance.

The shroud comprises an upper shroud portion 4 and a lower shroud portion 5. Both portions are tubular, with the upper shroud portion in this embodiment having a larger internal diameter than the external diameter of the lower shroud portion 5. One end of the upper portion 4 is located concentrically around the top end of the lower shroud portion 5.

The lower shroud portion 5 is secured to the gearbox housing 3, which is in turn pivotally fixed to a rigid part of the vehicle body. This could, for example, be part of the vehicle bulkhead. The pivot axis lies in a horizontal plane orthogonal to the axis of the steering shaft. This allows the whole assembly to be adjusted up and down for rake angle.

Clearly, some way of fixing the upper shroud portion 4 in position relative to the lower shroud portion is needed. This should be releasable so that the shroud can collapse and extend telescopically during an adjustment, yet be able to hold the upper portion securely when driving to stop the wheel moving unintentionally.

To hold the upper shroud portion in place, a releasable clamp mechanism is provided which secures the upper shroud portion 4 to a mounting bracket 6. The bracket 6, in turn, is secured to the vehicle body through a ride down mechanism which includes a breakable capsule or capsules 6a and an energy absorbing device.

The bracket 6 comprises a base portion and two spaced apart arms 8 that depend from the base portion. The arms 8 and base 7 together form an inverted U-shape, defining a region between the arms. A rail 10 of box section having side and top walls is secured to the top face of the upper shroud portion, the width of the box section being roughly equal to the spacing between the arms. The top wall is actually split along its entire length. Each of the arms 8 of the bracket is provided with a generally vertically extending slot (not shown). The side walls of the rail 10 are also provided with slots 11 but instead of extending generally vertically they extend generally parallel to the axis along which the shroud telescopes. The rail 10 is located between the arms of the bracket and a clamp pin 13 passes through the slots in the arms and rails. The moving portion can therefore hang from the pin 13 that hangs from the bracket.

The slots in the bracket arms allow the pin 13 to move up and down relative to the bracket 6 that in turn causes the upper shroud portion 4 to move up and down giving rake adjustment. The slots 11 in the rail 10 allows the upper shroud portion 4 to move giving reach adjustment.

Each end of the clamp pin 13 is provided with a fixed head outside of the bracket, and between one of the fixed heads and an arm 8 of the bracket 6 is a cam mechanism operated by a lever 12. The cam mechanism comprises a fixed cam part that is fixed to the clamp pin so that it rotates with the pin. This part is also fixed to the lever. The cam mechanism also includes a follower that is fixed so that it cannot rotate. As the cam is rotated one way by the lever it causes the overall width of the cam mechanism (measured along the axis of the pin) to increase. Rotating the cam the other way decreases its width. The effect of the cam mechanism is that as the width increases the arms of the bracket are squeezed onto the sides of the rail. This action secures the rail and hence the upper shroud portion in place.

A slot in the top of the upper shroud portion 4 is also provided, which lies between the sides of the rail 10. This slot helps the upper shroud portion squeeze onto the lower shroud portion and the rail is squeezed helping to remove any free play between the upper and lower shroud portions.

In use, the lever 12 can be rotated to place the clamp mechanism in the unclamped state, allowing the clamp pin 13 to move along the slots. It can then be rotated to move the clamp mechanism to its clamped position locking the assembly in place.

In the event of a crash where a high load axial load is applied to the steering shaft through the wheel, the force will initially travel along a path through the clamp pin 13 and bracket 6 to the vehicle. If this force is very large, it may cause the capsules 6a to break. When this happens, the upper portion 4 becomes free to telescope towards the lower shroud portion 5. The energy absorbing part of the ride down mechanism which acts between the to bracket and the mount then comes in to play to resist this collapse, absorbing the collapse force in a controlled manner. Without the breaking capsule, the bracket may prevent any movement at all of the upper shroud that could lead to injury of the driver.

The embodiment as described so far is as known from the prior art. Where it differs significantly is in the provision of an additional blocking mechanism that helps to prevent damage to the ride down mechanism or the clamp mechanism during adjustment. This blocking mechanism and its function will now be described in detail.

A stopper is provided which comprises a threaded shaft 20 that extends from the gearbox housing alongside the lower shroud portion 5 towards the clamp bracket 6 and which carries a threaded block 21 on its free end. The block 21 can be rotated to adjust the relative axial position of an end face 22 of the block 21 and the lower shroud portion.

The lever 12 comprise a grip part 12a that extends away from the axis of the clamp pin and a blocking part 12b in the form of a protrusion which extends away from the grip part 12a. The blocking part defines a blocking mechanism. When the lever 12 is moved to unclamp the clamp mechanism the blocking part 12b of the lever is aligned axially with the block 21 such that with the upper shroud 4 collapsed to the end of its normal range of travel the stopper 21 and blocking part 12b are in contact. Additionally, a protrusion is provided on the upper shroud portion which contacts an opposing face of the blocking part 12b of the lever 12 when the upper shroud is in that position. In this embodiment the protrusion on the upper shroud part is an end face of the clamp rail 10.

Figure 2:
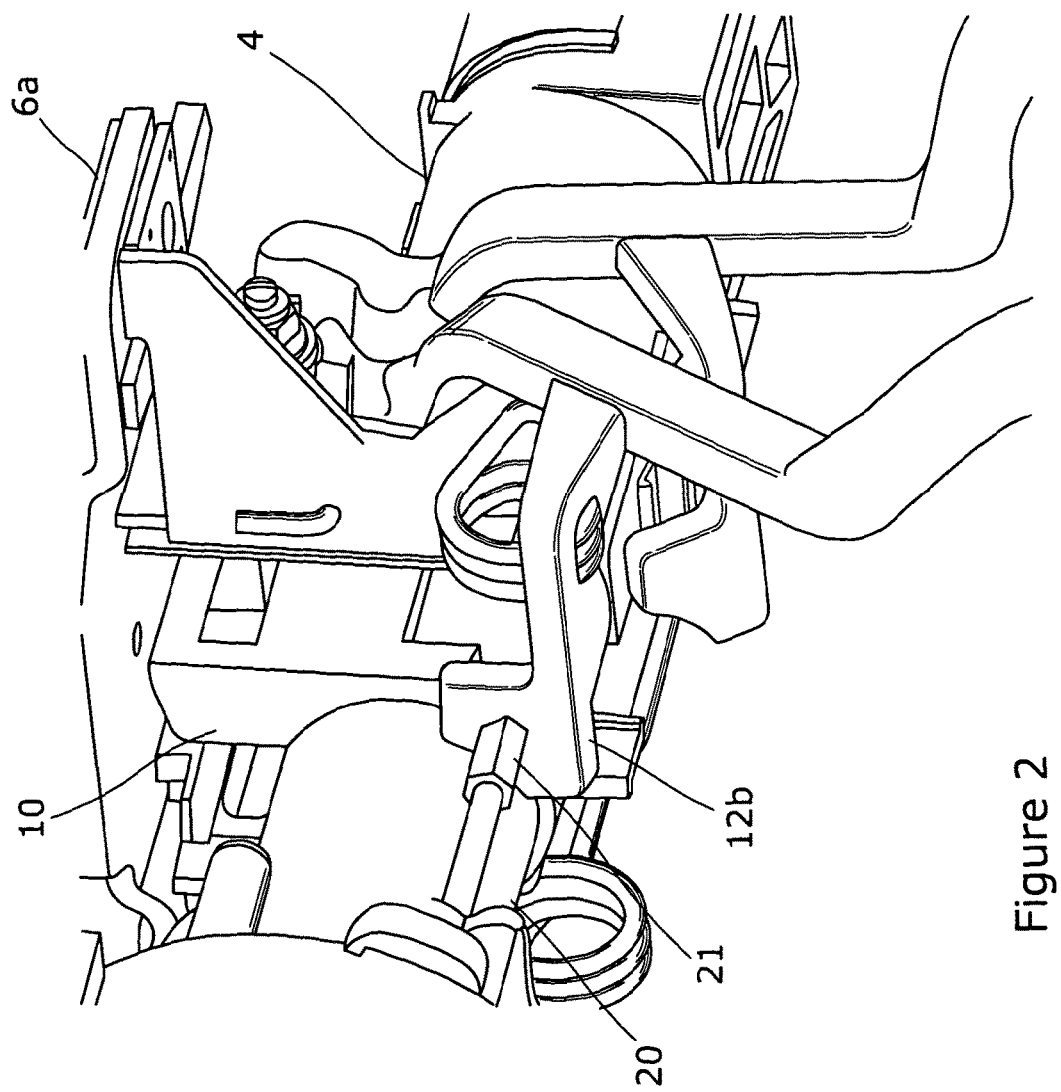
FIG. 2 is an enlarged perspective view of part of the assembly of FIG. 1.

The upper part 4 is therefore prevented from moving further in the collapse direction as the blocking part 12b is squashed between the block 21 and the clamp rail 10, the blocking part and stopper being made from relatively incompressible materials such as metal. FIG. 1 shows the lever in this position as labelled as 50. This also been seen in FIG. 2 which is an enlarged perspective view of part of the steering assembly 100.

When the lever 12 is moved to a position in which the clamp mechanism is clamped the blocking part 12b is held away from the block and the protrusion so that additional collapse is possible. This is shown in FIG. 1 with the lever position labelled 40.

The blocking mechanism 12b is therefore so arranged that when the clamp mechanism is in its first position the blocking mechanism 12b prevents the moving portion from collapsing beyond the normal range of movement in the collapse direction by providing a path for axial forces applied to the moving portion to pass through the blocking mechanism to a stopper fixed relative to the vehicle body, the path bypassing both the ride down mechanism and the clamp mechanism, and when the clamp mechanism is in its second position the lock mechanism is held clear of the stopper to permit additional telescopic movement of the moving portion towards the fixed portion beyond the normal range of adjustment.

The direct path through the blocker part bypasses both the ride down mechanism and also the clamp mechanism to prevent damage to the capsules and the clamp pin if excessive force is applied during adjustment of the column.

Also notable in this embodiment is a sleeve 31 which is provided around the clamp pin 30. This is shown in FIGS. 3 and 4 of the drawings. The sleeve 31 is of compressible material and is provided with a void 32 on the side of the pin that faces the steering wheel. The sleeve defines a spacer. When the upper shroud portion 4 approaches the end of its normal range of travel, defined by the position of the end of the slot 11 in the rail 10 nearest the steering wheel, the sleeve 31 contacts the end of the slot 11 to prevent further movement. If additional force is applied the sleeve will compress as the void 32 is collapsed, which allows the upper shroud finally to move to the end of its normal range of travel pressed hard against the end of the slot 10.

The sleeve 31, when uncompressed, holds the upper portion 4 slightly away from the end of its normal travel so that the blocker 12b, when the lever 12 is in the unclamped position, is spaced slightly from the stopper 21 and the end of the clamp rail. The spacing is about 2-3 mm. This spacing ensures the lever can still be moved to the clamped position with the upper shroud portion almost at the end of its travel, and reduces the risk of the blocker rubbing against, or striking, the stopper as the assembly is clamped.

If additional axial force is applied to the upper shroud portion 4 through the steering wheel it will compress the sleeve 31 which brings the stopper 21, blocker 12b and clamp rail together to stop additional movement of the upper shroud portion beyond its normal range of travel.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A steering column assembly having an adjustable shroud comprising a fixed portion secured relative to a vehicle body and a moving portion which can be collapsed telescopically through a normal range of adjustment relative to said fixed portion, a support bracket secured to a fixed part of said vehicle body through a ride down mechanism which permits relative movement of said bracket and said vehicle body in the event that a force is applied to said moving portion that exceeds a predetermined level, a clamp mechanism which releasably fixes said moving portion in position relative to said support bracket mounted to said vehicle body, a lever being operable to permit a user to cause said clamp mechanism to move between a first, unclamped, position in which said moving portion can move relative to said support bracket and said fixed portion and a second, clamped, position in which said fixed portion and moving portion are prevented from relative movement by clamping of said moving portion to said support bracket, and a blocking mechanism so arranged that when said clamp mechanism is in said first position said blocking mechanism prevents said moving portion from collapsing beyond said normal range of movement in a collapse direction by providing a path for axial forces applied to said moving portion to pass through said blocking mechanism to a stopper fixed relative to said vehicle body, said path bypassing both said ride down mechanism and said clamp mechanism, and when said clamp mechanism is in said second position said blocking mechanism is held clear of said stopper to permit additional telescopic movement of said moving portion towards said fixed portion beyond said normal range of adjustment, and in which said blocking mechanism comprises a blocking part of said lever, said blocking part of said lever moving into a position where said blocking part contacts said stopper to prevent excess travel as said lever is moved to place said clamp mechanism in said unclamped position, and then moving out of the way of said stopper when said clamp mechanism is clamped, wherein said clamping mechanism has a clamp pin and said blocking mechanism is directly formed on the lever.

2. The steering column assembly according to claim 1 wherein said clamp mechanism comprises a U-shaped bracket having spaced arms that fit around a rail secured to said moving portion, each of said spaced arms of said bracket including an opening through which said clamp pin passes, said clamp pin also passing through at least one elongate slot in said rail and being free to move along said elongate slot when said clamp mechanism is in said first position and prevented from moving when in said second position.

3. The steering column assembly according to claim 2 wherein said blocking mechanism contacts said rail as well as said stopper when an end of normal travel is reached.

4. The steering column assembly according to claim 1 wherein said stopper comprises a block threadedly secured to a threaded shaft which is fixed relative to said fixed portion to permit axial adjustment of a position of said stopper relative to said fixed portion.

5. The steering column assembly according to claim 4 wherein said end of said threaded shaft remote from said stopper is located in a hole provided in a gearbox housing onto which said fixed portion is secured.

6. The steering column assembly according to claim 1 wherein said blocking mechanism contacts a part of said moving portion as well as said stopper when an end of normal travel is reached.

7. The steering column assembly according to claim 1 wherein said blocking part comprises a finger which extends generally away from an axis of rotation of said lever.

8. The steering column assembly according to claim 1 which includes a resilient spacer which must be compressed for said moving portion to reach said end of its normal range of travel in collapse by a compressive force that exceeds a predetermined value which is less than the force required to activate said ride down mechanism, said spacer when uncompressed ensuring that a small gap is present between said stopper and said blocking mechanism sufficient to enable said clamp to be moved to said clamp position without said blocking mechanism striking said stopper.

9. The steering column assembly according to claim 8 in which said resilient spacer acts between said clamp mechanism and said moving portion.

10. The steering column assembly according to claim 8 wherein said clamp pin can move along at least one elongate slot in a clamp rail that is fixed to said moving portion, and in which said spacer acts between said clamp pin and an end of said at least one slot when said moving portion reaches an end of said moving portion normal range of travel.

11. The steering column assembly according to claim 10 wherein said spacer comprises a compressible sleeve which fits around at least a part of said clamp pin.

* * * * *